United States Patent [19]

Smith et al.

[11] Patent Number: 5,021,801
[45] Date of Patent: Jun. 4, 1991

[54] ANTENNA SWITCHING SYSTEM

[75] Inventors: John M. Smith, Elgin; Joseph J. Schuler, Schaumburg, both of Ill.

[73] Assignee: Motorola, Inc., Schaumburg, Ill.

[21] Appl. No.: 402,721

[22] Filed: Sep. 5, 1989

[51] Int. Cl.⁵ .............................................. H01Q 3/24
[52] U.S. Cl. ................................... 343/876; 455/277; 455/278
[58] Field of Search ...................... 343/876; 455/31, 32, 455/33, 277, 278

[56] References Cited

U.S. PATENT DOCUMENTS

| | | | |
|---|---|---|---|
| 2,738,464 | 3/1956 | Abbett | 455/277 |
| 4,063,243 | 12/1977 | Anderson et al. | 343/876 |
| 4,170,759 | 10/1979 | Stimple et al. | 343/876 |
| 4,317,229 | 2/1982 | Craig et al. | 455/277 |
| 4,412,223 | 10/1983 | Kautz | 343/876 |
| 4,485,486 | 11/1984 | Webb et al. | 455/33 |
| 4,549,311 | 10/1985 | McLaughlin | 455/277 |
| 4,737,978 | 4/1988 | Burke et al. | 455/33 |
| 4,811,032 | 3/1989 | Boksberger et al. | 343/876 |

FOREIGN PATENT DOCUMENTS 60-223337  11/1985  Japan ................ 455/277
60-226229  11/1985  Japan ................ 455/277

OTHER PUBLICATIONS

"Matrix Assembly", Model SRF2230A, Motorola Inc. Publication No. 68P81053E29A, dated Sep. 30, 1988.

Primary Examiner—Michael C. Wimer
Assistant Examiner—HoangAnh Le
Attorney, Agent, or Firm—Kenneth W. Bolvin

[57] ABSTRACT

An antenna switching system for handling high traffic sectors in a cellular radiotelephone system. The system switches the cell's base station transmitters to sectors that have more mobile traffic than they can handle. The additional transmitters increase the number of frequencies in the overloaded sector, thereby allowing a greater amount of mobile traffic to use the cell.

8 Claims, 2 Drawing Sheets

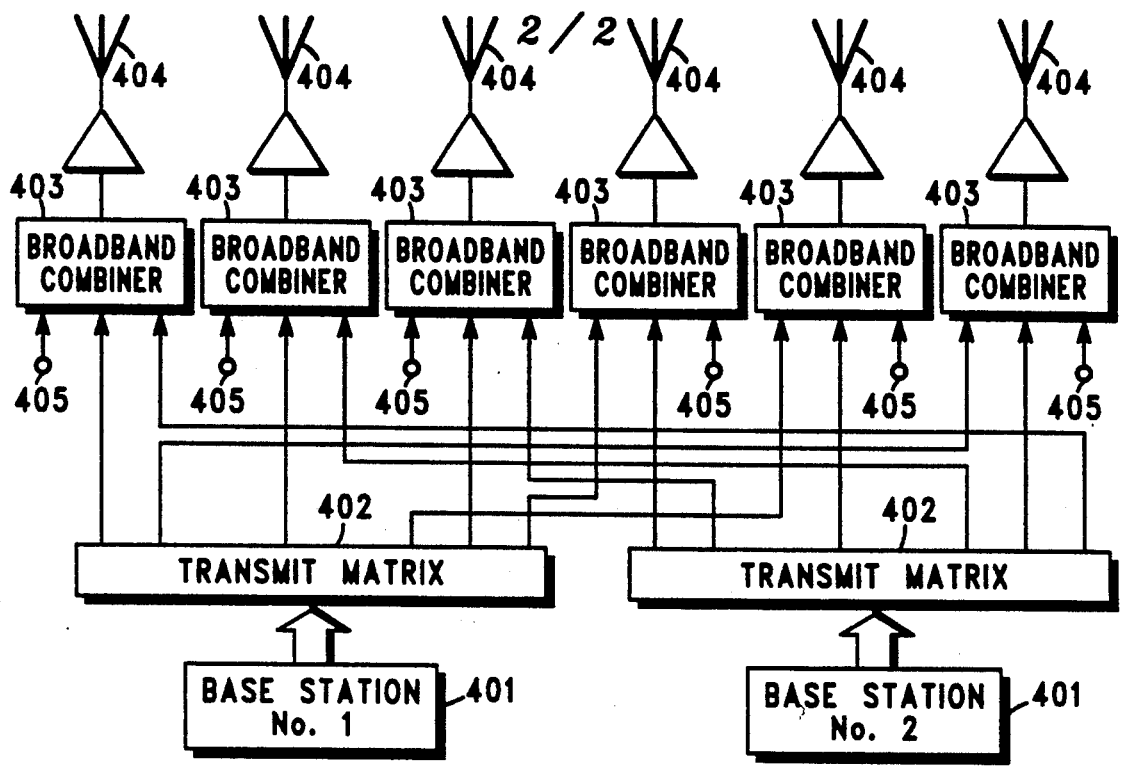
FIG.4
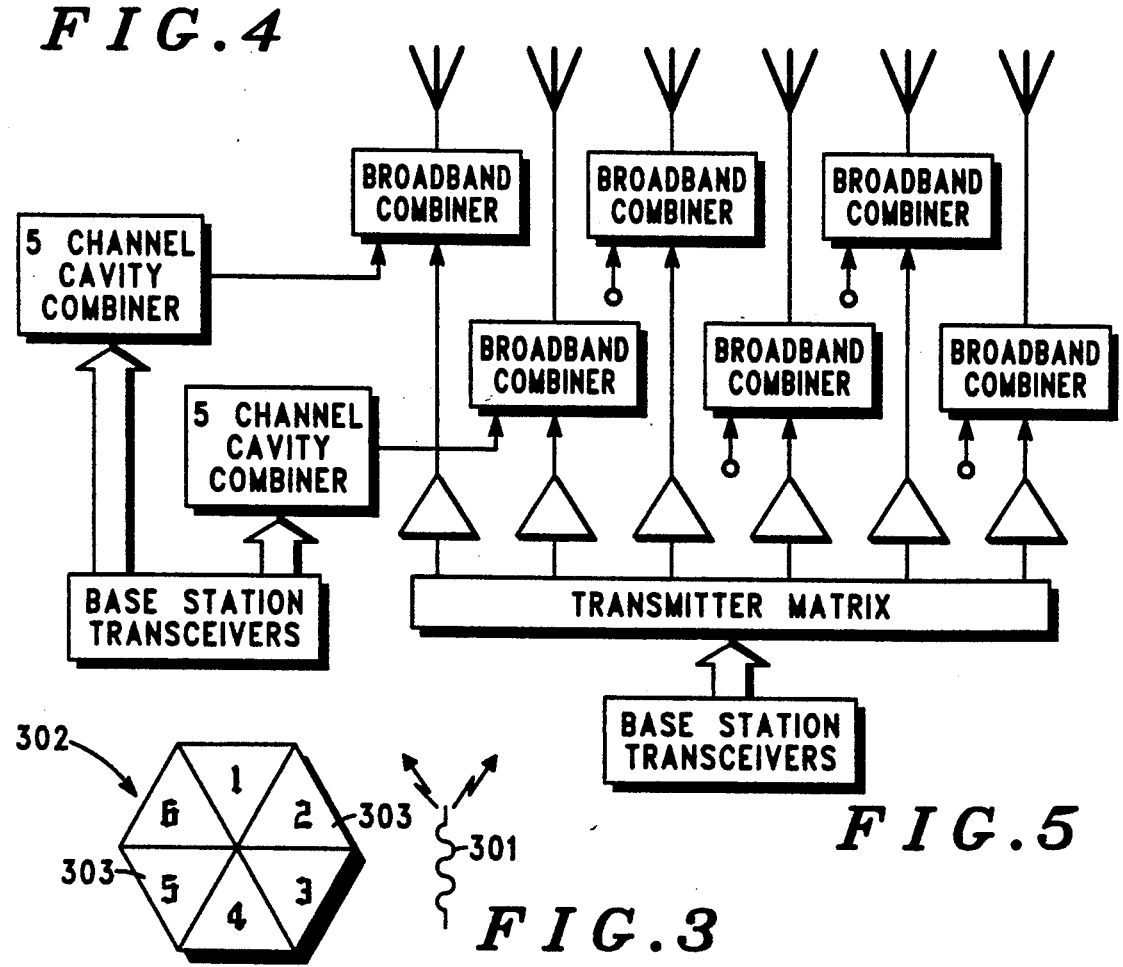
FIG.5
FIG.3

ANTENNA SWITCHING SYSTEM

TECHNICAL FIELD

This invention relates generally to the switching of antennas. More particularly, this invention relates to the routing of radiotelephone transmissions from a transmitter to a particular antenna in a cellular radiotelephone system.

BACKGROUND OF INVENTION

Cellular radiotelephone cells typically consist of a number of transmitters that transmit, in either omnidirectional or directional antenna patterns, from the cell. The highest capacity cells use directional antennas, dividing the cell into sectors. A major metropolitan area can consist of a large number of these cells. The cells are linked to the land telephone line allowing mobile radiotelephone users to access the land telephone lines and vice versa.

Using the cellular radiotelephone system, a mobile radiotelephone user can travel across a metropolitan area while keeping in contact with the land telephone lines. As a mobile user travels through an area, he may travel through more than one sector of a cell or, depending on the distance traveled, more than one cell. The cellular system takes care of handing off the user's call to another sector or cell.

The mobility of the user means that the sectors within a cell could have widely varying demand at any given time. This variability could cause some sectors to become overloaded while other sectors may have excess capacity. Presently, when a sector has more users than it can handle, the users trying to communicate in that sector are either shifted to another sector or they must wait for a frequency to become free.

Cellular base station receivers are diversity receivers which require 2 antenna inputs. In sector receive configurations, the 2 receiver inputs come from one even and one odd numbered sector that are adjacent. In order to route these 2 inputs from the odd or even antenna to the receiver, a configuration of passive splitters and matrix switches is used. The passive splitter splits the signal from the antenna into multiple signals to be handled by different receivers. The switch matrix switches the signals to the appropriate receivers. This configuration does not allow receivers to handle signals from any sector in the cell. Each receiver can only receive from the odd or even sector matrix to which it is assigned.

Each sector of a cell typically has a single antenna for transmitting. In order to transmit on multiple frequencies in that sector, therefore, multiple transmitters must be combined on that single antenna. FIG. 1 illustrates the present method of combining transmitters onto an antenna. The transmitters (A) produce a signal that is amplified (B) and passed through a combiner (C). The combiner (C) merges the signals allowing a number of transmitters (A) to transmit on one antenna (E).

The combiner (C) contains resonant cavities which each allow only one frequency at which the cavity is tuned to pass to the antenna (E). The cavities are manually tuned to a certain frequency which can only be changed by manually retuning the cavity. Therefore, only a limited number of fixed tuned frequencies can be transmitted from present sector cell configurations.

Because mobile traffic is not distributed evenly, it is continuously changing in number and location, and present transmitter hardware is limited to a fixed number of frequencies within a sector, there exists a need to move underutilized transmitters and/or frequencies from sector to sector with varying traffic demands.

SUMMARY OF THE INVENTION

The antenna switching system includes at least one transmission source. The signals from the transmission source are switched to the appropriate antenna by a switch matrix. A broadband combiner, located between the switch matrix and the antennas, combines the switched signals into a single output. In some system applications, additional amplifiers are not needed and the output from the combiner is directly connected to an antenna. However, a highly linear amplifier is required between the combiner and the antenna if a higher power output level is required at the cell site.

The switch matrix can route any or all transmitters to any of the sector antennas that are handling mobile users, accommodating in real time the traffic demand. This will increase the number of frequencies in those sectors, thereby allowing the cell site to handle more mobile traffic without increasing the number of transmitters.

BRIEF DESCRIPTION OF THE DRAWINGS

FIG. 3 is a diagram of a cell site with 60° sectors;

FIG. 4 is a block diagram of an alternate embodiment of the present invention with multiple base stations; and FIG. 5 is a block diagram of an alternate embodiment of the present invention.

BEST MODE FOR CARRYING OUT THE INVENTION

The antenna switching system provides dynamic frequency allocation in a cell. In other words, a transmitter can be switched to other sectors in a cell on demand. This is accomplished by the use of a switch matrix similar to the matrix used in the receive portion of a cell. For proper operation, however, this transmit matrix is used in conjunction with a linear power amplifier and a single combiner.

Figure 1:
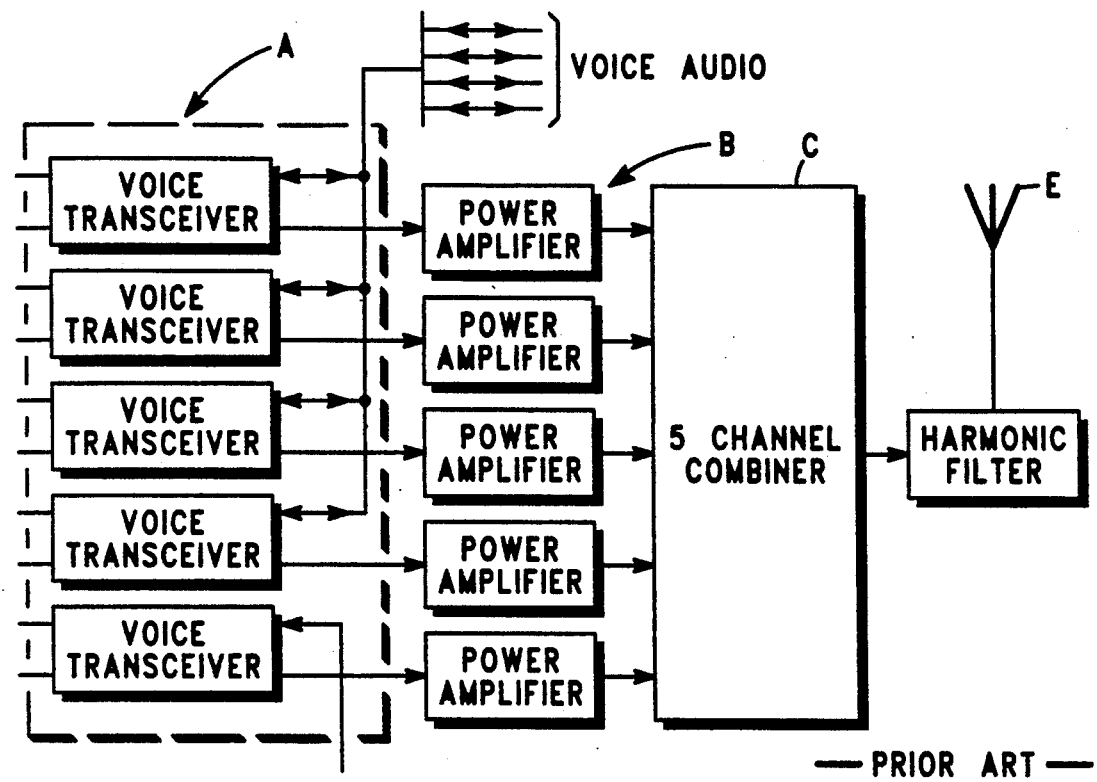
FIG. 1 is a block diagram of the prior art.
Figure 2:
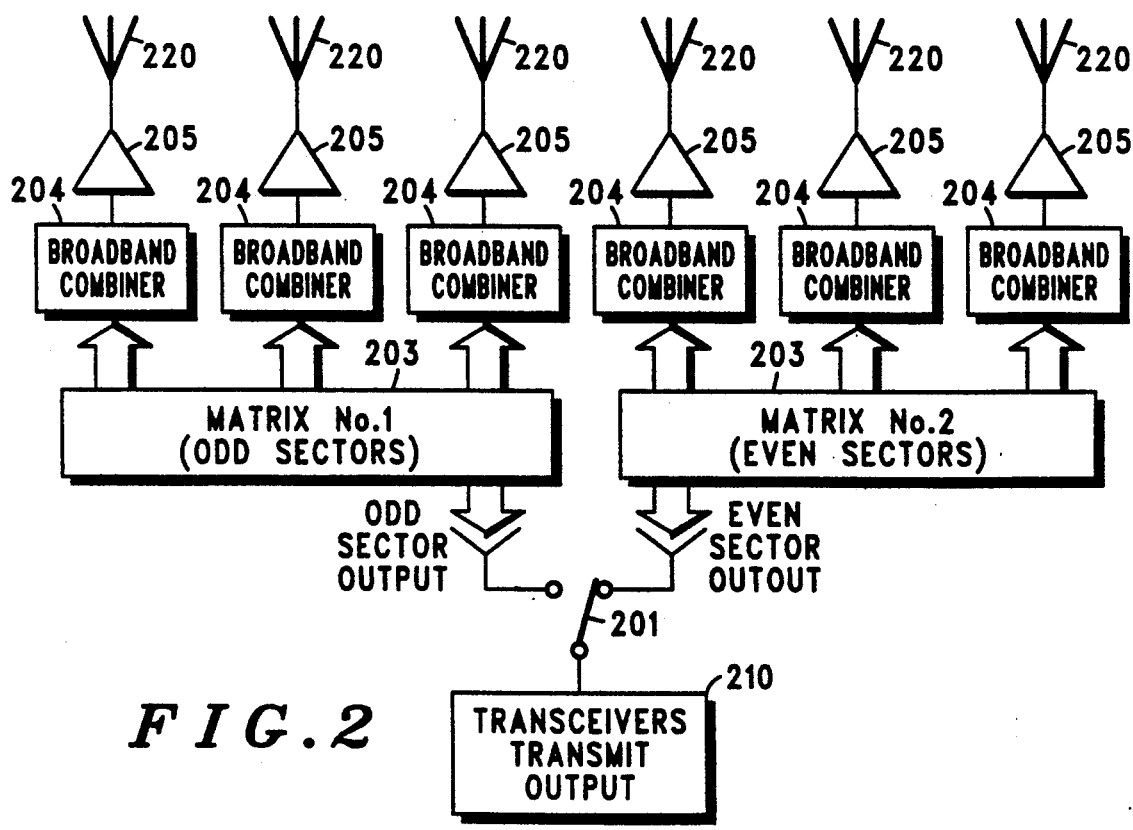
FIG. 2 is a block diagram of one embodiment of the present invention with a single base station.

FIG. 2 shows a single base station with the capability of switching between all odd and even sectors of a cell. The odd/even sector configuration of a cell is illustrated in FIG. 3. The odd/even sector switch (201) may be used when a mobile user (301) travels between sectors (303) of a cell (302). In this case, if the mobile user (301) travelled from sector 3 to sector 2, the sector switch would allow the base station (210) to follow the mobile user (301) from the odd to the even sector. This would also apply to a mobile user going from an even sector to an odd sector. The odd/even sector switch function may also be incorporated within the matrix switches (203).

Once the odd or even sector is selected, the signal is switched by the switch matrix (203). The switch matrix (203) routes the signal to the appropriate broadband antenna combiner (204) that is within the sector the switch matrix (203) controls. Both the switch matrix (203) and the sector switch (201) have the task of isolating one antenna (220) from another.

A broadband combiner (204) combines signals of different frequencies, from the switch matrices, to be transmitted on one antenna. The broadband combiner (204) output may feed a linear power amplifier (205). The input to the linear power amplifier will be signals of multiple frequencies that will generate intermodulation products if the amplifier is non-linear. Therefore, the linear power amplifier (205) must have a very linear amplification for proper operation of the cell site.

The linear power amplifier is only required for normal cell site coverage in a metropolitan area. If the antenna switching system is used in a building or other situations where high power is not needed, the linear power amplifier can be removed and the antenna switching system will still operate properly.

A typical cell configuration uses a number of base stations for transmitting and receiving. A base station consists of a number of transmitters and receivers and typically has 8 to 10 frequencies for communication.

FIG. 4 illustrates a multiple base station configuration, the typical configuration of a cell. As in the single base station configuration, the signal from the base station (401) is transmitted to the appropriate switch matrix (402). The switch matrix (402) switches the signal to the broadband combiner (403) feeding the appropriate antenna (404). The broadband combiners (403) illustrated in FIG. 4 are shown having unconnected inputs (405). This denotes that this embodiment can be expanded with additional switch matrices without departing from the present invention.

FIG. 5 illustrates an alternate embodiment to interface the cavity combiner hardware presently used to the antenna switching system. Using this scheme, the cell will have some channels fixed in a sector and some reserved to accommodate changing traffic demands, thereby reducing the cost of upgrading a cell.

The antenna switching system allows dynamic frequency allocation in a cell. This is a result of the ability to switch base station transmitters from sector to sector and because resonant cavity combiners are not needed. An overburdened sector in a cell can request a transmitter from another sector to assist in handling the traffic. The transmitters switched into the overburdened sector will be capable of transmitting on any frequency available in the system, thereby increasing the number of frequencies in that sector. If the system had control hardware/software to determine what frequency to assign to minimize interference between users, this invention would allow all the base stations in a cell to operate in one sector of the cell if needed.

Those skilled in the art will recognize that various modifications and changes could be made to the invention without departing from the spirit and scope thereof. It should therefore be understood that the claims are not to be considered as being limited to the precise embodiments set forth in the absence of specific limitations directed to such embodiments.

We claim:

1. An antenna switching system, comprising:
   (a) at least one signal transmission source for generating a plurality of radio frequency signals;
   (b) means, coupled to the at least one signal transmission source, for switching the plurality of radio frequency signals;
   (c) radio frequency combining means, having an input and an output, for combining the plurality of signals from the means for switching, the input of the radio frequency combining means coupled to the means for switching;
   (d) amplification means having an input and an output, the input of the amplification means coupled to the output of the radio frequency combining means; and
   (e) at least one antenna coupled to the output of the amplification means.

2. The antenna switching system of claim 1 wherein the means for switching is at least one switch matrix operably coupled to at least one odd/even sector switch.

3. The antenna switching system of claim 1 wherein the means for switching routes a signal from a first antenna to a second antenna.

4. The antenna switching system of claim 1 wherein a first antenna is isolated from a second antenna by the means for switching.

5. The antenna switching system of claim 1 wherein the means for combining is a broadband combiner.

6. The antenna switching system of claim 1 wherein the amplification means is a linear power amplifier.

7. A dynamic frequency allocation system for allocating frequencies between sector antennas of a base station having a plurality of odd and even sector antennas, each odd sector antenna coupled to an odd sector switch matrix and each even sector antenna coupled to an even sector switch matrix, the odd and even switch matrices each having a plurality of inputs and outputs, the system comprising;
   (a) at least one signal transmission source for generating at least one signal;
   (b) sector switching means, coupled to a first signal transmission source of the at least one signal transmission source, for routing a first signal of the at least one signal from the first signal transmission source to a first input of the odd switch matrix or a first input of the even switch matrix;
   (c) a plurality of radio frequency signal combining means, each having an input and an output, the input of a first radio frequency signal combining means coupled to first output of the odd or even switch matrix;
   (d) a plurality of linear power amplification means, each having an input and an output, the input of a first linear power amplification means coupled to a first output of the radio frequency signal combining means; and
   (e) a first one of the sector antennas coupled to a first output of the linear power amplification means.

8. An antenna switching system for switching a plurality of signals among sector antennas of a base station having a plurality of odd and even sector antennas, an odd sector switch matrix, and an even sector switch matrix, the odd sector switch matrix switching a signal to an odd sector antenna and the even sector switch matrix switching a signal to an even sector antenna, the system comprising;
   (a) at least one signal transmission source for generating the plurality of signals;
   (b) switching means, coupled to the at least one signal transmission source, for switching the plurality of signals among the odd and even sector switch matrices; and
   (c) combining means, coupled to the odd and even sector antennas, for combining the plurality of signals from the odd sector switch matrix onto the odd sector antennas and the plurality of signals from the even sector switch matrix onto the even sector antennas.

* * * * *